(12) United States Patent
Heussler et al.

(10) Patent No.: US 10,760,971 B2
(45) Date of Patent: Sep. 1, 2020

(54) OPTICAL INTERFERENCE DEVICE

(71) Applicant: National University of Singapore, Singapore (SG)

(72) Inventors: Sascha Pierre Heussler, Singapore (SG); Herbert Oskar Moser, Karlsruhe (DE); Alok Pathak, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 15/124,600

(22) PCT Filed: Mar. 12, 2015

(86) PCT No.: PCT/SG2015/000075
§ 371 (c)(1),
(2) Date: Sep. 8, 2016

(87) PCT Pub. No.: WO2015/137880
PCT Pub. Date: Sep. 17, 2015

(65) Prior Publication Data
US 2017/0016770 A1   Jan. 19, 2017

Related U.S. Application Data

(60) Provisional application No. 61/952,583, filed on Mar. 13, 2014.

(51) Int. Cl.
*G01J 3/453* (2006.01)
*G01J 3/02* (2006.01)

(52) U.S. Cl.
CPC .......... *G01J 3/4531* (2013.01); *G01J 3/0205* (2013.01); *G01J 3/0208* (2013.01); *G01J 3/0229* (2013.01); *G01J 3/0272* (2013.01)

(58) Field of Classification Search
CPC ...... G01J 3/4531; G01J 3/0208; G01J 3/0272; G01J 3/0229; G01J 3/02; G01J 3/0205;
(Continued)

(56) References Cited

U.S. PATENT DOCUMENTS 4,057,326 A * 11/1977 Knop ................... G02B 5/1857
359/568
4,348,105 A    9/1982 Caprari
(Continued)

FOREIGN PATENT DOCUMENTS

DE      102005041203 A1 *  3/2007 ............... G03F 1/84
EP         1040927 A2    10/2000
(Continued)

OTHER PUBLICATIONS https://en.wikipedia.org/wiki/Bragg%27s_law.*
(Continued)

*Primary Examiner* — Mohamed K Amara

(57) ABSTRACT

An optical interference device is disclosed herein. In a described embodiment, the optical interference device comprises a phase shifter array for receiving a collimated beam of light. The phase shifter array includes an array of cells for producing optical light channels from respective rays of the collimated beam of light, with at least some of the optical light channels having varying phase shifts. The optical interference device further includes a focusing lens having a focal distance and arranged to simultaneously produce, from the optical light channels, a focused beam of light in its focal plane and an image downstream the phase shifter array for detection by an optical detector. The optical interference device also includes an optical spatial filter arranged at the focal distance of the focusing lens and arranged to filter the focused beam of light to produce a spatially distributed interference light pattern in zero$^{th}$ order for detection by the
(Continued)

optical detector. A method for producing a spatially distributed interference light pattern is also disclosed.

20 Claims, 11 Drawing Sheets

(58) Field of Classification Search
CPC .......... G01J 3/2803; G01J 3/10; G01J 3/2823; G01J 3/0256; G01J 1/0437; G01J 1/0271; G01J 1/0295; G01J 1/0411; G01J 5/08; G01J 5/0834; G01J 5/44; A61B 5/0075
See application file for complete search history.

(56) References Cited

U.S. PATENT DOCUMENTS

| | | | | |
|---|---|---|---|---|
| 4,974,919 A * | 12/1990 | Muraki | G03F 7/70075 | 353/122 |
| 4,999,234 A * | 3/1991 | Cowan | G02B 5/1857 | 369/273 |
| 5,111,325 A * | 5/1992 | DeJager | G02B 13/0005 | 359/206.1 |
| 5,243,619 A * | 9/1993 | Albers | G02B 3/06 | 359/489.09 |
| 5,619,245 A * | 4/1997 | Kessler | B41J 2/45 | 347/237 |
| 5,654,798 A * | 8/1997 | Bruning | G01B 11/2441 | 356/512 |
| 5,757,544 A * | 5/1998 | Tabata | G02B 27/0081 | 359/385 |
| 5,802,092 A * | 9/1998 | Endriz | B41J 2/45 | 359/622 |
| 5,808,657 A * | 9/1998 | Kurtz | B41J 2/451 | 347/239 |
| 5,828,492 A * | 10/1998 | Moser | G02B 5/1876 | 359/575 |
| 5,854,671 A * | 12/1998 | Nishi | G03F 7/70066 | 355/53 |
| 6,016,199 A * | 1/2000 | Newton | G01J 3/26 | 356/454 |
| 6,084,710 A * | 7/2000 | Katsuma | G11B 7/1353 | 359/566 |
| 6,091,496 A * | 7/2000 | Hill | G02B 21/004 | 356/491 |
| 6,121,625 A | 9/2000 | Ito | | |
| 6,268,921 B1 * | 7/2001 | Seitz | G01B 11/026 | 356/407 |
| 6,278,548 B1 * | 8/2001 | Shimano | B82Y 10/00 | 359/565 |
| 6,295,119 B1 | 9/2001 | Suzuki | | |
| 6,383,719 B1 | 5/2002 | Bula et al. | | |
| 6,441,383 B1 | 8/2002 | Ito et al. | | |
| 6,449,237 B1 * | 9/2002 | Yoo | G02B 5/1876 | 369/112.05 |
| 6,747,799 B2 * | 6/2004 | Fabiny | G02B 5/1861 | 359/569 |
| 6,773,142 B2 * | 8/2004 | Rekow | G02B 27/09 | 235/462.35 |
| 6,804,269 B2 * | 10/2004 | Lizotte | B23K 26/0608 | 372/100 |
| 7,009,771 B2 * | 3/2006 | Bourdelais | G02B 5/0221 | 359/454 |
| 7,050,171 B1 * | 5/2006 | Banerjee | G01J 3/4532 | 356/450 |
| 7,057,632 B2 * | 6/2006 | Yamawaki | G02B 26/124 | 347/129 |
| 7,106,418 B2 | 9/2006 | Jen | | |
| 7,248,770 B2 * | 7/2007 | Parker | B82Y 20/00 | 385/129 |
| 7,330,266 B2 * | 2/2008 | Guerineau | G01J 3/0259 | 356/454 |
| 7,359,058 B2 * | 4/2008 | Kranz | G01J 3/4532 | 356/452 |
| 7,639,722 B1 * | 12/2009 | Paxton | G02B 27/0972 | 359/831 |
| 7,643,152 B2 * | 1/2010 | de Boer | A61B 5/0059 | 356/479 |
| 7,649,615 B2 | 1/2010 | Case et al. | | |
| 7,751,063 B2 * | 7/2010 | Dillon | G01B 11/2527 | 356/497 |
| 7,841,719 B2 * | 11/2010 | Podoleanu | A61B 3/102 | 351/212 |
| 7,982,881 B2 * | 7/2011 | Fercher | A61B 3/102 | 351/221 |
| 7,990,543 B1 * | 8/2011 | Mello | G01B 11/2441 | 356/512 |
| 8,009,358 B2 * | 8/2011 | Zalevsky | G02B 27/0927 | 359/618 |
| 8,305,577 B2 | 11/2012 | Kivioja et al. | | |
| 8,320,621 B2 * | 11/2012 | McEldowney | G03B 17/54 | 356/5.01 |
| 8,345,226 B2 | 1/2013 | Zhang | | |
| 8,345,234 B2 * | 1/2013 | Myrick | G01J 3/02 | 356/300 |
| 8,446,593 B1 * | 5/2013 | Ellerbee | G01B 9/02004 | 356/479 |
| 8,665,440 B1 * | 3/2014 | Kompaniets | G01N 21/31 | 356/402 |
| 8,993,974 B2 * | 3/2015 | Goodwin | G01J 1/42 | 250/370.01 |
| 9,066,087 B2 * | 6/2015 | Shpunt | G01B 11/25 | |
| 9,116,039 B2 * | 8/2015 | Shkunov | G01J 5/0806 | |
| 9,207,122 B2 * | 12/2015 | Auner | G01J 3/18 | |
| 9,273,846 B1 * | 3/2016 | Rossi | G02B 3/005 | |
| 9,366,861 B1 * | 6/2016 | Johnson | G02B 26/125 | |
| 9,736,459 B2 * | 8/2017 | Mor | G02B 27/0983 | |
| 9,791,684 B2 * | 10/2017 | Villiger | G01J 3/453 | |
| 2003/0096176 A1 | 5/2003 | Akira et al. | | |
| 2004/0027582 A1 * | 2/2004 | Dulman | G01B 11/0608 | 356/511 |
| 2004/0258353 A1 * | 12/2004 | Gluckstad | G02B 6/02347 | 385/28 |
| 2005/0007601 A1 * | 1/2005 | Rosakis | G01B 11/303 | 356/521 |
| 2005/0046864 A1 * | 3/2005 | Millerd | G01B 11/303 | 356/495 |
| 2005/0062949 A1 * | 3/2005 | Irie | G03F 7/70066 | 355/53 |
| 2005/0100827 A1 | 5/2005 | Liao et al. | | |
| 2005/0213472 A1 * | 9/2005 | Ikenaka | G11B 7/127 | 369/112.13 |
| 2006/0279732 A1 | 12/2006 | Wang et al. | | |
| 2007/0018286 A1 * | 1/2007 | Chen | G03F 7/0035 | 257/640 |
| 2007/0153293 A1 * | 7/2007 | Gruhlke | G06F 3/0317 | 356/511 |
| 2007/0165013 A1 * | 7/2007 | Goulanian | G09G 3/003 | 345/204 |
| 2007/0260349 A1 | 11/2007 | Hendrik et al. | | |
| 2008/0024763 A1 * | 1/2008 | Li | G01J 3/4532 | 356/73 |
| 2008/0038467 A1 | 2/2008 | Jagannathan et al. | | |
| 2008/0285049 A1 * | 11/2008 | Rembe | G01B 9/02045 | 356/497 |
| 2009/0021598 A1 * | 1/2009 | McLean | G01J 3/02 | 348/222.1 |
| 2009/0114818 A1 * | 5/2009 | Casares | H01J 37/045 | 250/307 |
| 2009/0161090 A1 * | 6/2009 | Campbell | A61B 3/0091 | 356/3 |
| 2010/0253941 A1 * | 10/2010 | Brady | G01J 3/02 | 356/310 |
| 2011/0180695 A1 * | 7/2011 | Li | G02B 3/0018 | 250/216 |
| 2011/0188054 A1 * | 8/2011 | Petronius | B23P 11/00 | 356/610 |
| 2011/0218403 A1 * | 9/2011 | Tearney | A61B 5/0066 | 600/165 |

(56) References Cited

U.S. PATENT DOCUMENTS

| | | | | |
|---|---|---|---|---|
| 2011/0299104 | A1* | 12/2011 | Seo | G01J 3/02 358/1.9 |
| 2012/0057345 | A1* | 3/2012 | Kuchibhotla | G02B 27/0961 362/237 |
| 2012/0236212 | A1* | 9/2012 | Itoh | G02B 3/005 348/744 |
| 2012/0236288 | A1* | 9/2012 | Stanley | G01B 11/2513 356/4.01 |
| 2012/0314058 | A1* | 12/2012 | Bendall | G01C 3/08 348/135 |
| 2013/0027711 | A1* | 1/2013 | Hajian | G01J 3/0294 356/451 |
| 2013/0038881 | A1* | 2/2013 | Pesach | G01B 11/25 356/610 |
| 2013/0038941 | A1* | 2/2013 | Pesach | G01B 11/25 359/619 |
| 2013/0076857 | A1* | 3/2013 | Kurashige | G01B 11/25 348/40 |
| 2013/0215406 | A1 | 8/2013 | Heussler et al. | |
| 2013/0215428 | A1 | 8/2013 | Ishimaru | |
| 2014/0049635 | A1* | 2/2014 | Laffargue | G01F 25/0084 348/135 |
| 2014/0055784 | A1* | 2/2014 | Kremer | G01J 3/2823 356/302 |
| 2014/0097252 | A1* | 4/2014 | He | G06K 7/10722 235/462.41 |
| 2014/0104618 | A1* | 4/2014 | Potsaid | G02B 26/105 356/497 |
| 2014/0239071 | A1* | 8/2014 | Hennick | G06K 7/10732 235/455 |
| 2014/0347672 | A1* | 11/2014 | Pavillon | A61B 5/0066 356/491 |
| 2015/0077760 | A1* | 3/2015 | Koerner | G01B 9/02008 356/496 |
| 2015/0253469 | A1* | 9/2015 | Le Gros | G02B 3/0006 359/619 |
| 2015/0316368 | A1* | 11/2015 | Moench | H01S 5/005 348/46 |
| 2015/0355470 | A1* | 12/2015 | Herschbach | G02B 27/0977 362/11 |
| 2016/0026838 | A1* | 1/2016 | Gillet | G02B 26/101 235/462.21 |
| 2016/0102975 | A1* | 4/2016 | McCloskey | G01B 21/02 702/97 |
| 2016/0202478 | A1* | 7/2016 | Masson | G02B 26/0833 353/30 |
| 2016/0290784 | A1* | 10/2016 | Wojtkowski | G01B 9/0201 |
| 2016/0349228 | A1* | 12/2016 | Kester | G01J 5/0896 |
| 2017/0135584 | A1* | 5/2017 | Tearney | A61B 5/0084 |
| 2017/0336626 | A1* | 11/2017 | Hayashi | G02B 27/0081 |

FOREIGN PATENT DOCUMENTS

| | | |
|---|---|---|
| JP | H04196513 A | 7/1992 |
| JP | H08124829 A | 5/1996 |
| JP | H08250446 A | 9/1996 |
| JP | H08330220 A | 12/1996 |
| JP | H10335215 A | 12/1998 |
| JP | 2000-206449 A | 7/2000 |
| JP | 2001-513191 A | 8/2001 |
| JP | 2002236371 A | 8/2002 |
| JP | 3380878 A | 2/2003 |
| JP | 2007027742 A | 2/2007 |
| JP | 2007079458 A | 3/2007 |
| JP | 2008089617 A | 4/2008 |
| JP | 2008-309707 A | 12/2008 |
| JP | 2008309706 | 12/2008 |
| JP | 2009069592 A | 4/2009 |
| JP | 2012-058068 A | 3/2012 |
| JP | 2014-501937 A | 1/2014 |
| TW | I333059 B | 11/2010 |
| WO | WO 1995/035516 A1 | 12/1995 |
| WO | WO 2003/065427 A1 | 8/2003 |
| WO | WO 2004/109225 A1 | 12/2004 |
| WO | WO2009070459 | 6/2009 |
| WO | WO2012057707 | 5/2012 |
| WO | WO 2013/116516 A1 | 8/2013 |
| WO | WO2013129519 | 9/2013 |

OTHER PUBLICATIONS https://www.thefreedictionary.com/cell.*
https://www.thefreedictionary.com/compartment.*
PCT International Search Report for corresponding PCT Application No. PCT/SG2015/000075 dated Jun. 16, 2015, 3 pages.
Gallegos et al., "Label-free biodetection using a smartphone," Lab on a Chip, The Royal Society of Chemistry, RSC Publishing, 2013, pp. 2124-2132.
Global mobile statistics 2014 Home: all the latest stats onmobileWeb, apps, marketing, advertising, subscribers, and trends . . . , mobiThinking, Dec. 2013, retrieved from <<https://www.mobithinking.com/mobile-marketing-tools/latest-mobile-stats>>, 9 pages.
Heussler, "Design, Micro-Manufacturing, and Characterization of a New Fast Parallel-Processing Fourier Transform Interferometer (FTIR) with Single Non-Periodic Pulse Capability," National University of Singapore, 2010, 232 pages.
Image Intesifier Tubes—PHOTONIS, 2012, 3 pages.
Lyon et al., "DETECHIP: An Improved Molecular Sensing Array," Forensic Research, 2011, vol. 2, Issue 4, retrived from <<https://www.omicsonline.org/2157-7145/2157-7145-2-126.pdf>>, pp. 1-7.
Manzardo et al., "Miniature lamellar grating interferometer based on silicon technology," Optics Letters, Jul. 1, 2004, vol. 29, No. 13, pp. 1437-1439.
Smith et al., "Cell-Phone-Based Platform for Biomedical Device Development and Education Applications," retrieved from <<http://www.plosone.org>>, PlosONE, vol. 6, Issue 3, Mar. 2011, pp. 1-11.
Strong et al., "Lamellar Grating Far-Infrared Interferomer," Journal of the Optical Society of America, vol. 50, No. 2, Feb. 1960, pp. 113-118.
Moser, H.O., et al., "Single-shot-capable fast multichannel Fourier transform interferometer based on a microfabricated 3D multimirror array", Proc. of SPIE, 2012, vol. 8428, pp. 84280Y-1-84280Y-10.
Fukuda, M. et al., "Three-dimensional patterning using fine step motion in synchrotron radiation lithography". Journal of Vacuum Science & Technology B-J Vac Sci Technol B. 24. 10.1116/1.2366620. (2006).
Harvey, E. et al., "Fabrication Techniques and their application to produce novel Micromachined Structures and Devices using Excimer Laser Projection," Proc. SPIE,, vol. 3223, 1997.
Heussler, S. et al., "Multichannel Fourier-Transform Interferometry for Fast Signals", Optics Express, v. 19, n 13, pg. 12628-12633 (Jun. 20, 2011).
Heussler S. et al., "Pulsed and High-Speed FTIR Spectroscopy", Next-Generation Spectroscopic Technologies V, SPIE v. 8374, n. 1 (May 11, 2012).
Heussler S. et al., "3D Deep X-Ray Lithography for Producing a Multi-VChannel Fourier Transform Interferometer", Microsystem Technologies, v. 19, n. 3, pg. 335-341 (Mar. 1, 2013).
Hirai et al., "Moving mask UV lithography for three-dimensional structuring," Journal of Micromechanics and Microengineering, v. 17, n. 2, p. 199-206, 2007.
Katoh et al., "Direct writing for three-dimensional microfabrication using synchrotron radiation etching", Sensors and Actuators, v. 89, p. 10-15, 2001.
Lewis, M.F. et al., "The Use of Lenslet Arrays in Spatial Light Modulators", Pure and Applied Optics: J. of the Euro. Optical Society, Part A, v. 3, n. 2 (Mar. 1, 1994).
Rizvi, N. et al., "Developments in laser micro-machining techniques," Journal of Materials Processing Technology, v. 127, 2002, p. 206-210.

* cited by examiner

OPTICAL INTERFERENCE DEVICE

This application is a national stage application of International Patent Application PCT/SG2015/000075, filed Mar. 12, 2015, claiming priority U.S. Provisional Application No. 61/952,583, filed Mar. 13, 2014, entitled "AN OPTICAL INTERFERENCE DEVICE" which applications are hereby incorporated by reference in their entirety.

BACKGROUND AND FIELD

The invention relates to an optical interference device.

An example of an optical interference device is a grating spectrometer which is commonly used to measure the spectral properties of light over a specific portion of the electromagnetic spectrum. When used in spectroscopy, the measurement may then be analysed to determine characteristics of materials exposed to the light.

However, existing spectrometers are either relatively large in size or if they are small, they suffer from low light throughput as well as low spectral resolution.

It is an object of the present invention to provide an optical interference device which addresses at least one of the disadvantages of the prior art and/or to provide the public with a useful choice.

SUMMARY

In a first aspect, there is provided an optical interference device comprising: a phase shifter array for receiving a collimated beam of light, the phase shifter array having an array of cells for producing optical light channels from respective rays of the collimated beam of light, at least some of the optical light channels having varying phase shifts; a focusing element having a focal distance and arranged to simultaneously produce, from the optical light channels, a focused beam of light in its focal plane and an image downstream the phase shifter array for detection by an optical detector; and an optical spatial filter arranged at the focal distance of the focusing element and arranged to filter the focused beam of light to produce a spatially distributed interference light pattern in zero$^{th}$ order for detection by the optical detector.

An advantage of the described embodiment is that this enables the components of the optical interference device to be arranged on a same optical plane and thus, a very compact optical interference device may be achieved.

It is envisaged that the focusing element may include a lenslet array, with each lenslet arranged to receive some of the optical light channels or a respective optical light channel. In such an embodiment, the spatial filter may include an aperture array, with each aperture arranged at the focal distance of the respective lenslet of the lenslet array.

Preferably, at least some of the cells of the array of cells may be blank cells which do not affect the phase of the rays incident on the respective blank cells. This is particularly useful to measure source uniformity and the information may be used to compensate for non-uniform illumination.

The phase shifter array may have various configurations and dimensions. For example, in one embodiment, at least some of the cells of the array of cells may include a lamellar structure. In one example, the lamellar structure may include alternately raised and recessed surfaces. The lamellar structure may have an even number or an odd number of the raised and recessed surfaces. In another example, the alternately raised and recessed surfaces may form a concentric pattern.

Specifically, the focusing element may be a focusing lens or mirror. An optical collimator may form part of the optical interference device and if that's the case, then the optical interference device further comprises an optical collimator arranged to produce the collimated beam of light. The optical interference may also further comprise an entrance aperture for directing an incident light towards the optical collimator.

Preferably, an interferogram may be derived from the spatially distributed interference light pattern, and a spectrum may be derived from the interferogram by using a system of linear equations. The linear equations may include using matrix inversion.

The optical interference device may be used in various applications and thus, the optical interference device may be adapted as a Fourier spectrometer, or a Raman spectrometer.

The optical interference device may also be adapted to detect two (or more) spectroscopic channels at the same time. Thus, the optical interference device may further comprise a further phase shifter array arranged adjacent to the phase shifter array, wherein the further phase shifter array is arranged to receive a reference beam of light.

Due to its very compact size, the optical interference device may be adapted to be used with handheld or portable devices for transmission or absorbance measurements. Thus, in a second aspect, there is provided a combined product in which there is the optical interference device as described above with the optical interference device including an optical housing for housing the optical collimator, the phase shifter array, the focusing lens and the spatial filter, and a portable computing device having the optical detector in the form of a camera or focal plane array, the optical housing being adapted to be fitted to the camera or focal plane array wherein the camera may be configured to detect the spatially distributed interference light pattern.

In a third aspect, there is provided a phase shifter array for receiving a collimated beam of light, the phase shifter array having an array of cells for producing optical light channels from respective rays of the collimated beam of light, at least some of the optical light channels having varying phase shifts; wherein the array of cells includes at least some blank cells which do not affect the phase of the rays incident on the respective blank cells; and a lamellar structure having cells of varying depths for producing the optical light channels having varying phase shifts.

An advantage of the described embodiment is that this enables the source uniformity to be measured simultaneously and this information may then be used to compensate for non-uniform illumination. In this way, spectral information may be computed.

Preferably, the blank cells may be generally flat. In an embodiment, the lamellar structure may include alternately raised and recessed surfaces. The lamellar structure may include an even number or an odd number of the raised and recessed surfaces. In a described embodiment, the alternately raised and recessed surfaces may form a concentric pattern.

In a fourth aspect, there is provided a method for producing a spatially distributed interference light pattern, comprising: receiving a collimated beam of light, producing optical light channels from respective rays of the received collimated beam of light, at least some of the optical light channels having varying phase shifts; providing a focusing element having a focal distance; simultaneously producing, by the focusing element, from the optical light channels, a focused beam of light in its focal plane and an image downstream for detection by an optical detector; and providing an optical spatial filter at the focal distance of the focusing element and filtering the focused beam of light by the optical spatial filter to produce the spatially distributed interference light pattern in zero$^{th}$ order for detection by the optical detector.

It should be appreciated that features relevant to one aspect may also be relevant to the other aspects.

BRIEF DESCRIPTION OF THE DRAWINGS

Exemplary embodiments will now be described with reference to the accompanying drawings, in which.

DETAILED DESCRIPTION OF PREFERRED EMBODIMENTS

Figure 1:
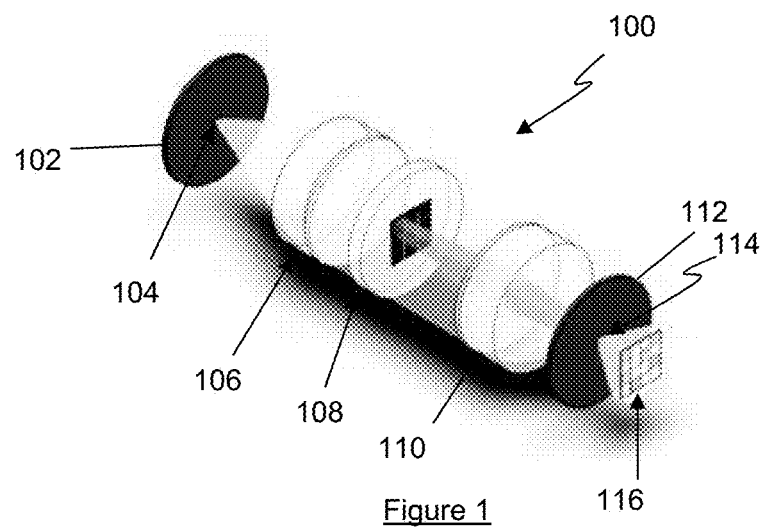
FIG. 1 is a schematic diagram of an optical interference device in the form of a spectrometer according to a preferred embodiment and which includes a phase shifter array.

FIG. 1 is a schematic diagram of an optical interference device in the form of a spectrometer 100 according to a preferred embodiment. The spectrometer 100 includes an entrance optical spatial filter 102 having an entrance aperture 104, a collimating lens 106, a phase shifter array 108, a focusing element in the form of a focusing lens 110, and an exit optical spatial filter 112 having an exit aperture 114.

The entrance optical spatial filter 102 is arranged to receive light from a light source (not shown) and the entrance optical spatial filter 102 is arranged to limit and direct the light from the light source to the collimating lens 106. The collimating lens 106 collimates the light into a collimated beam of light for the phase shifter array 108 which produces optical light channels from respective rays of the collimated beam of light. It should be appreciated that at least some of the optical light channels have varying phase shifts.

The focusing lens 110 receives the optical light channels from the phase shifter array 108 and is arranged to produce a focused beam of light in its focal plane. The exit optical spatial filter 112 (and thus, the exit aperture 114) is arranged at a focal distance of the focusing lens 110, and is arranged to receive the focused beam of light from the focusing lens 110 and to produce a spatially distributed interference light pattern in zero$^{th}$ order for detection by an optical detector 116.

It should be noted that in addition to the focused beam of light, the focusing lens 110 is also arranged to produce an image of the phase shifter array 108 simultaneously and projecting the image for detection by the optical detector 116.

The optical detector 116 records a pixelated interference pattern and may send this pixel information to a processing module for computing spectral composition of the light.

Figure 3:
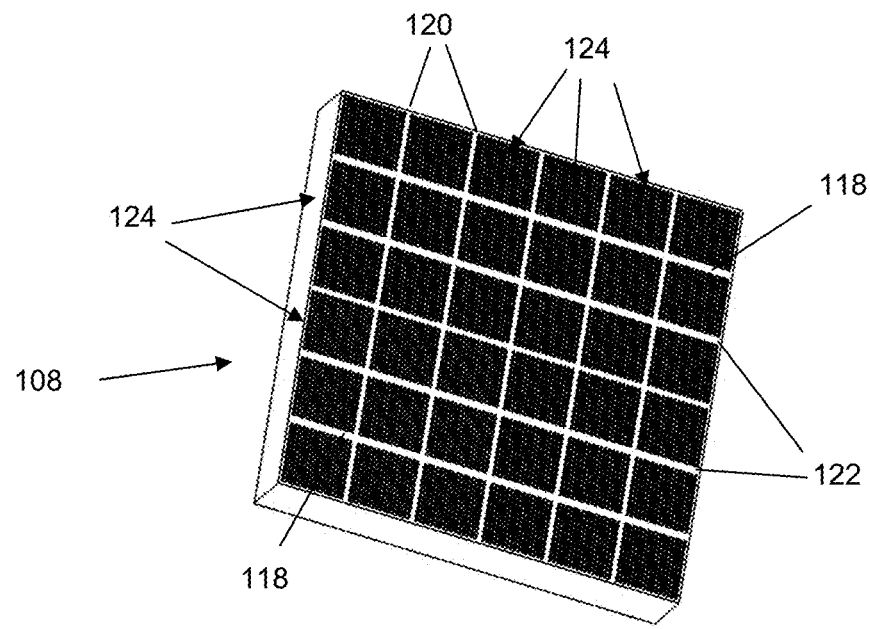
FIG. 3 is an enlarged view of the phase shifter array of FIG. 1.

FIG. 3 is a close up view of the phase shifter array 108 of the spectrometer of FIG. 1 and the phase shifter array 108 is made of micro-structured (and thus, quite appropriately termed as micro-phase shifter array or MPSA), transparent material such as glass or plastic. In this embodiment, the phase shifter array 108 includes a plurality of blank cells 118 which is arranged as a grid structure which forms five vertical and horizontal stripes 120,122 across the phase shifter array 108. As shown in FIG. 3, the grid structure of the blank cells 118 divides the phase shifter array 108 into 6×6 array sections 124 (although the number may change accordingly) with each array section 124 comprising a number of cell sections 126.

Figure 4:
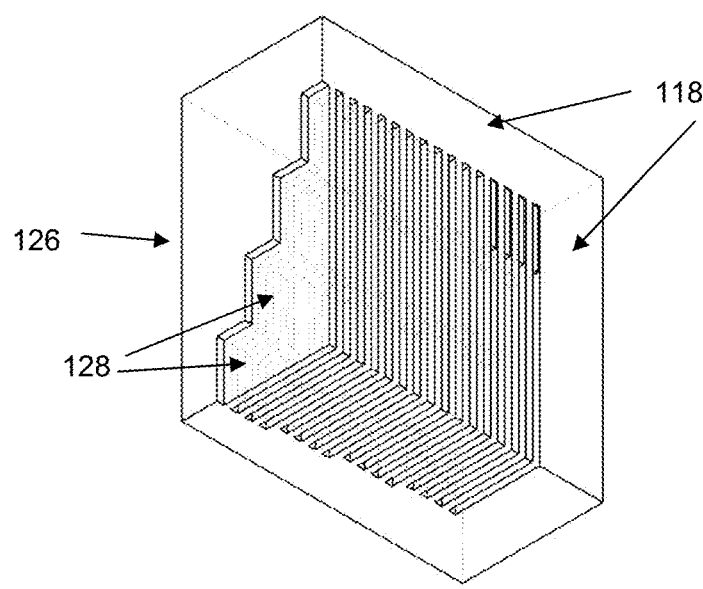
FIG. 4 is a magnified view of a cell section of the phase shifter array of FIG. 3.

FIG. 4 is a magnified view of one of the cell sections 126 having N×M cells or cell elements. In this embodiment, the cell section 126 is made up of 4×4 cells 128 adjacent some of the blank cells 118. Each cell differs from its neighbouring cell by its individual structural depth between its top and bottom ridges. This results in a changing or varying structure depth (see the steps in FIG. 4) and thus each individual cell 128 exhibits different optical phase characteristics. When the collimated beam of light from the collimated lens 106 is directed onto the phase shifter array 108, the cells 128 produce respective optical light channels (or measurement channels). The blank cells 118 (or "zero depth" cells when compared to the other cells 128) are used to record spatial intensity distribution of the light source across the phase shifter array. It should be appreciated that these blank cells 118 do not affect the phase of the rays of the collimated beam incident on these blank cells 118 but rather, these blank cells 118 are used to measure intensity (without affecting the phase of the rays). It should be mentioned that for computation or measurement of spectral information, the information needed are:

a) interference pattern generated by the phase shifter array 108; and b) non-uniformity of illumination of the phase shifter array 108 of the spectrometer 100.

With the blank cells 118, it is possible to measure the source uniformity and use this information to compensate for non-uniform illumination. The combination of cells 128 which cause phase shifts of the incident light ray and the blank cells 118 of the phase shifter array 108 allows monitoring of the source distribution illuminating the phase shifter array at the same time.

Again, the spatial intensity distribution is useful to compensate for non-uniform illumination. Arranging hundreds of the individual cells 128 in one or two perpendicular directions including the blank cells 118 make up the phase shifter array 108 of FIG. 3 for spectral calculations. This is particularly useful as it avoids the need for a separate blank sheet to be used to detect the source uniformity.

Figure 5:
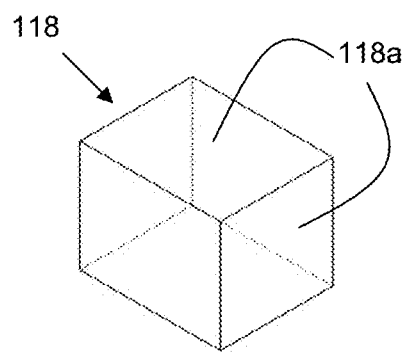
FIG. 5 shows a single cell in the form of a blank cell as an exemplary cell of the cell section of FIG. 4.

FIG. 4 illustrates a 4×4 cell section 126 which means the cell section 126 is made up of sixteen individual cells 128, arranged adjacent a number of the blank cells 118. FIG. 5 illustrates a structure of one of the blank cells 118 which is planar or generally flat on all the surfaces 118a.

Figure 6:
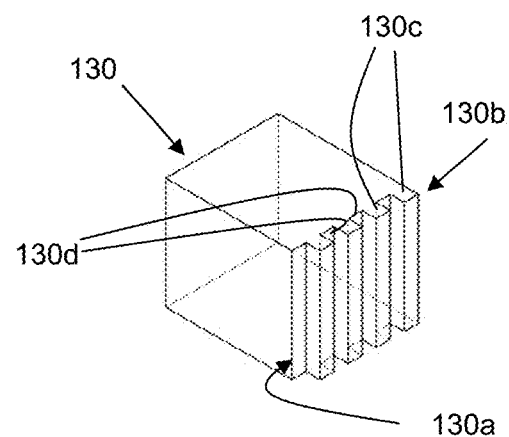
FIG. 6 shows a single cell having a first lamellar structure as an exemplary cell of the cell section of FIG. 4.

It should be appreciated that the cells 128 may come in different shapes, sizes and structures depending on the measurements to be obtained. FIG. 6 shows a first exemplary cell 130 having an illumination surface 130a with a lamellar structure 130b disposed on the illumination surface 130a. In this first exemplary cell 130, the lamellar structure 130b has a same number of alternately raised surfaces 130c and recessed surfaces 130d, which have substantially equal widths. In this case, there are four alternately raised and recessed surfaces 130c, 130d which is an even number. Needless to say, the number of recessed surfaces 130c, 130d may also be odd.

Figure 7:
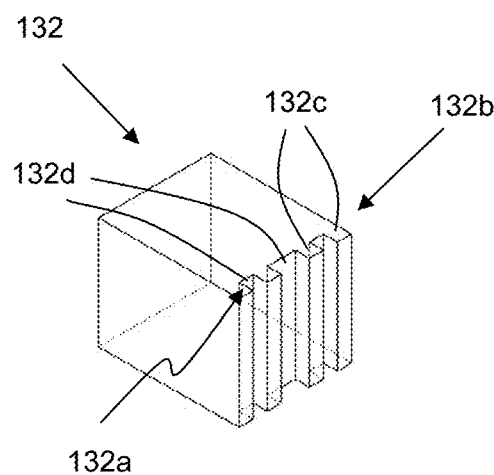
FIG. 7 shows a single cell having a second lamellar structure as an exemplary cell of the cell section of FIG. 4.

FIG. 7 shows a second exemplary cell 132 having an illumination surface 132a also with a lamellar structure 132b disposed on the illumination surface 132a. Unlike the first exemplary cell 130, the lamellar structure 132b has different numbers of alternately raised surfaces 132c and recessed surfaces 132d and the widths of these alternately raised and recessed surfaces 132c, 132d are also different from each other.

Figure 8:
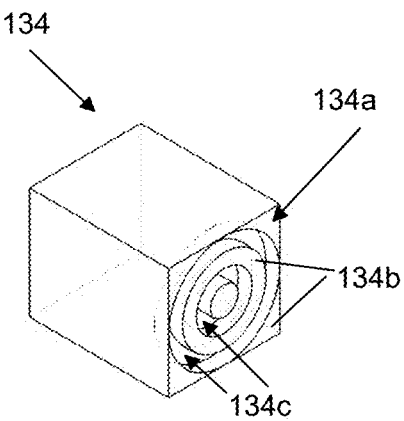
FIG. 8 shows a single cell having a concentric pattern as an exemplary cell of the cell section of FIG. 4.

It is envisaged that a lamellar structure of a cell may have different structures and dimensions and an example is shown in FIG. 8, which is a third exemplary cell 134 having a concentric lamellar structure 134a with alternately raised and recessed surfaces 134b, 134c.

The use of the blank cells 118 disposed among the cells 128 allows monitoring of source distribution illuminating the phase shifter array at the same time. This would enable non-uniform illumination to be compensated.

Figure 9:
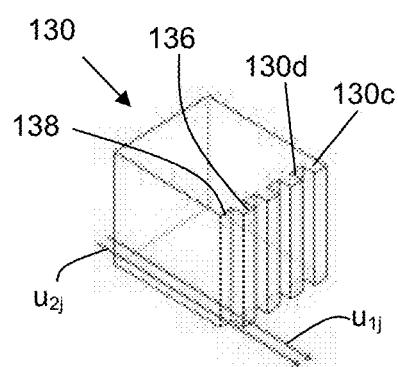
FIG. 9 shows the single cell of FIG. 6 with plane light waves illustrated travelling through two facets of the cell.
Figure 10:
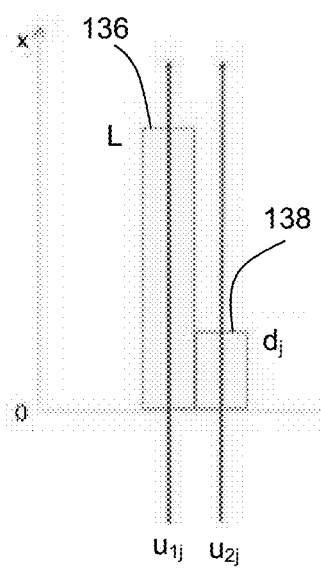
FIG. 10 is a cross sectional view of the two facets of FIG. 9.

Next, it would be appropriate to discuss how the phase shifter array 108 refracts the light rays as the rays transmit through the phase shifter array 108. For simplicity, FIG. 9 shows the single cell 130 of FIG. 6 with plane light waves $u_{1j}, u_{2j}$ illustrated travelling through first and second facets 136, 138 of the cell 130. For ease of explanation, the first facet 136 being one of the raised surfaces 130c and the second facet 138 being one of the recessed surfaces 130d, thus creating a depth between the two facets 136, 138. FIG. 10 is a cross sectional view of the two facets 136, 138 of FIG. 9 with X and Y axes drawn in.

To appreciate dispersion of the refractive index over the spectral range, it is assumed that the plane waves $u_{1j}, u_{2j}$ travel in the X-axis direction through the two facets 136, 138 of the cell 130 and with the two facets 136, 138 having respective thicknesses L, $d_j$ (i.e. cell lengths).

At thickness L of FIG. 10, reduced amplitudes of the two light waves or beams may be computed as:

$$\hat{u}_{1j}(k_0, L, t) = e^{ik_0 n(k_0) L} \quad \text{(Eq: 1-1)}$$

$$\hat{u}_{2j}(k_0, L, t) = e^{ik_0 n(k_0) d_j} e^{ik_0 (L - d_j)} = e^{ik_0 ((n(k_0) - 1) d_j + L)} \quad \text{(Eq: 1-2)}$$

where,
$k_0$=vacuum wave number (the subscript "0" denoting vacuum);
L=maximum thickness of the first facet 136;
$d_j$=thickness of the second facet 138;
j=a natural number counting each individual cell 128 of the phase shifter array 108; and
t=time.
Using the definition:

$$n(k_0) = n'n(k_0) + iK(k_0) \quad \text{(Eq: 1-3)}$$

where,
n'=real refractive index; and
K=extinction constant.
With these, the interference between the two light beams $u_{1j}, u_{2j}$ is computed by:

$$\hat{u}_{1j} + \hat{u}_{2j} = e^{-k_0 K(k_0) L} e^{ik_0 n'(k_0) L} + e^{-k_0 K(k_0) d_j} e^{ik_0 (n'(k_0) - 1) d_j + L)} \quad \text{(Eq: 1-4)}$$

From equation Eq:1-4, absolute square of the sum of the amplitudes of the two light beams $u_{1j}, u_{2j}$ that is proportional to power are calculated from:

$$|\hat{u}_{1j} + \hat{u}_{2j}|^2 = (\hat{u}_{1j} + \hat{u}_{2j})(\hat{u}_{1j} + \hat{u}_{2j})^* \quad \text{(Eq: 1-5)}$$

It follows for a simplified case of non-absorbing material, K=0:

$$|\hat{u}_{1j} + \hat{u}_{2j}|^2 = 2(1 + \cos(k_0 (n'(k_0) - 1)(L - d_j))) \quad \text{(Eq: 1-6)}$$

As a consequence, spectral power for $\overline{N} = N \times M$ wave number values within the design spectral range ($k_{0l}$, l=1, 2 ... $\overline{N}$; and $\overline{N}$ is number of cells) of the $j^{th}$ cell can be computed by:

$$\hat{I}_j = 2 \sum_{l=1}^{\overline{N}} g^2(k_{0l})(1 + \cos(k_{0l}(n'(k_{0l}) - 1)(L - d_j))) \quad \text{(Eq: 1-7)}$$

where, $j = 1, 2, \ldots \overline{N}$.

And $g^2(k_{0l})$ is the spectral power distribution of the light source.

From equation Eq. 1-7, a system of linear equations may be computed that can be solved using matrix inversion to obtain the interference pattern generated by the cell 130. In the case of evaluation of the interferogram by means of Fourier transformation, additional corrections of the frequency spectrum may be required to compensate for a wave number dependent peak position shift.

Although the above explanation is based on the cell 130, it should be apparent that the explanation similarly applies to the entire phase shifter array 108.

Figure 2:
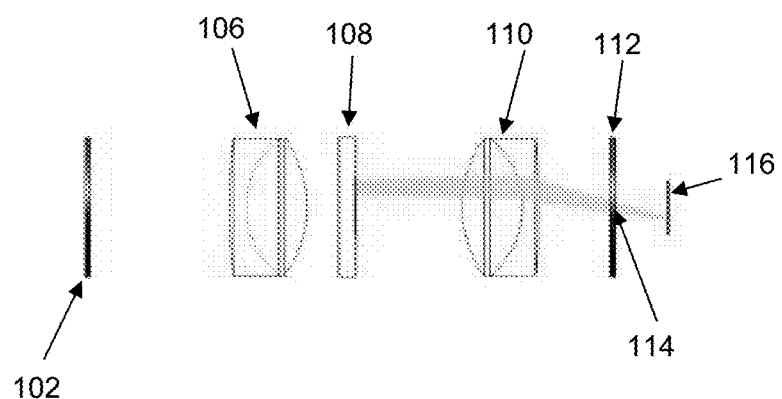
FIG. 2 is a side view of the spectrometer of FIG. 1.
Figure 11:
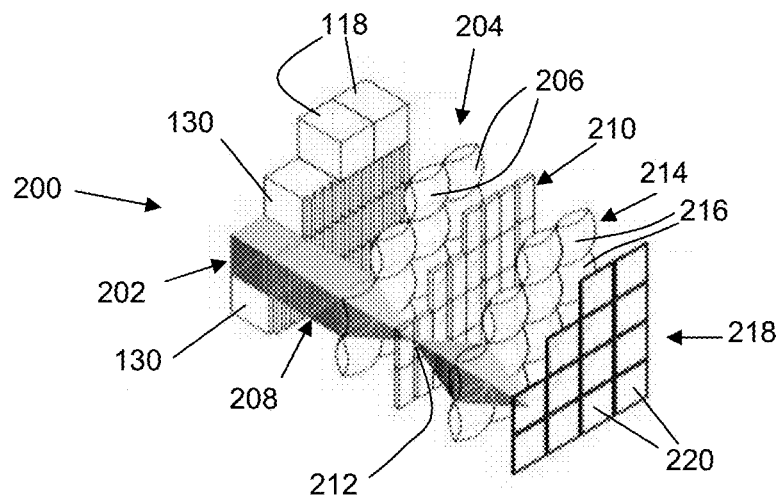
FIG. 11 is a schematic diagram of an alternative spectrometer arrangement to that shown in FIGS. 1 and 2 and which includes a plurality of lenslet.

It should be apparent that the focusing element may take other forms, not just the focusing lens 110 illustrated in FIGS. 1 and 2. For example, instead of using the single focusing lens 110 to image the entire phase shifter array 108, each phase shifter array cell 128 may be imaged by an individual lenslet and this first alternative spectrometer arrangement 200 is shown in FIG. 11 (with some of the other components omitted for ease of explanation), and FIG. 12 is a top cross sectional view of the arrangement of FIG. 11.

The first alternative spectrometer arrangement 200 includes an alternative phase shifter array 202 similar to that shown in FIG. 1 but comprising an array of the cells 130 of FIG. 6 (i.e. with the lamellar structure 130b) and the blank cells 118. Instead of the single focusing lens 110, the alternative spectrometer arrangement 200 includes a lenslet array 204 comprising a plurality of lenslets 206 with each lenslet 206 arranged to receive an optical light channel 208 from a respective cell 130 (or blank cell 118, as the case may be). This optical light channel 208 is shown as shaded in FIG. 11. In the alternative, it is also envisaged that each lenslet 206 may be arranged to receive some of the optical light channels produced by respective cells 130 (or blank cell 118 as the case may be).

The first alternative spectrometer arrangement 200 further includes an optical spatial filter in the form of an aperture array 210 arranged at a focal distance of the lenslet array 204. The aperture array 210 comprising a plurality of slit apertures 212 with each slit aperture 212 arranged at a focal distance of a corresponding lenslet 206. Further, downstream of the lenslet array 204 and the aperture array 210, the first alternative spectrometer arrangement 200 also includes a secondary lenslet array 214 comprising a plurality of secondary lenslets 216, and an optical detector in the form of a detector array 218.

Figure 12:
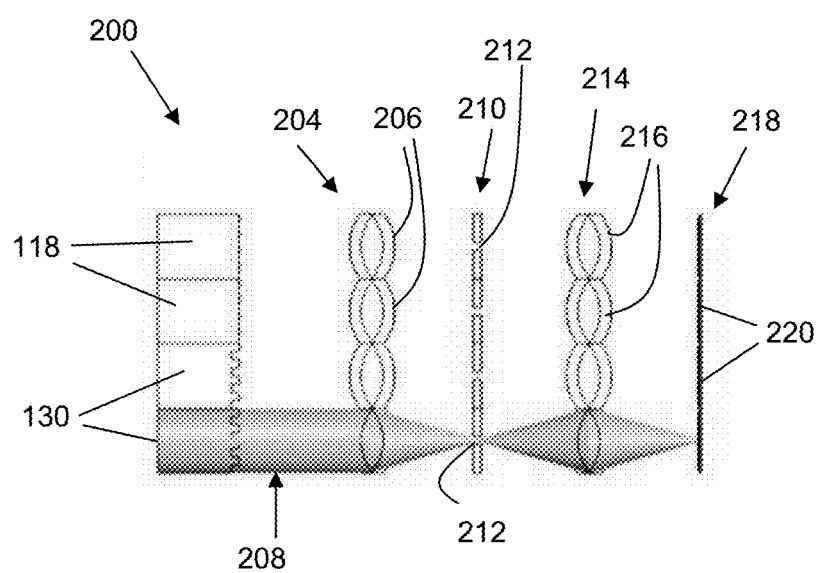
FIG. 12 is a top cross sectional view of the alternative spectrometer arrangement of FIG. 11.

As shown in FIG. 12, the secondary lenslets 216 are arranged to refocus the light beam from the aperture array 210 as a single pixel or a group of binned pixels for detection by respective detectors 220 of the detector array 218.

Figure 13:
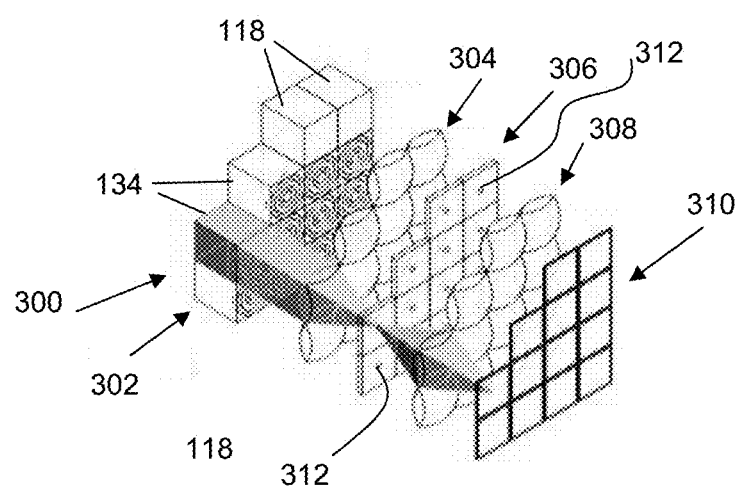
FIG. 13 is a schematic diagram of yet another alternative spectrometer arrangement to that shown in FIGS. 1 and 2 and which includes a plurality of lenslet.

With the use of the lenslet array 204, it is possible to achieve a very compact spectrometer. It should be appreciated that the lenslet array 204 (and the secondary lenslet array 214) may be formed by two or more individual lens array combined together such as two crossed cylindrical lenslet arrays instead of a singular lenslet array shown in FIG. 11. Needless to say, the alternative phase shifter array 202 may take other forms and a further example is shown in FIG. 13, which illustrates a second alternative spectrometer arrangement 300.

The second alternative spectrometer arrangement 300 includes an alternative phase shifter array 302 similar to that shown in FIG. 11 but comprising an array of the cells 134 of FIG. 8 (i.e. with the concentric structure 134a) and the blank cells 118. Similarly, a lenslet array 304 is arranged downstream and also an aperture array 306 arranged at a focal distance of the lenslet array 304, a secondary lenslet array 308, and a detector array 310.

In view of the concentric structure of the phase shifter array 302, unlike the arrangement of FIG. 11, the aperture array 306 includes a number of circular or pinhole apertures 312 which receives the (refracted) light beam from the phase shifter array 302.

The described embodiment and alternative arrangements have many advantages and solve numerous problems. For example:

Broader Free Spectral Working Range:

Dispersive elements like gratings or prisms tend to limit the spectral bandwidth of a device, referred to as free spectral range. For instance, the dispersion formula of a grating at normal incidence is described by the formula:

$$d(\sin \theta_m + \sin \alpha) = m\lambda \quad \text{(Eq.:2-1)}$$

where d=slit spacing, the so-called grating constant;
m=the diffraction order;
$\theta_m$=diffraction angle of the $m^{th}$ diffraction order;
α=incidence angle with reference to the grating normal; and
λ=wavelength.

Thus, for α=0, a given diffraction grating of fixed grating spacing d, and a diffraction order such as the first (m=1), diffracted beam $\theta_m$ forms a maximum for an angle $\theta_{m=1}=\sin^{-1}(\lambda/d)$. The same applies for the case of m=2 and a wavelength of λ/2, implying that the free spectral range for diffraction gratings is limited to one octave working band ($\lambda_{max}/\lambda_{min}$<2). As a result, conventional grating spectrometers require filtering of wavelengths beyond the working band of the grating.

In contrast, the optical interference device described in the embodiment does not require the filtering of wavelengths and can be tailored to work throughout the spectral bandwidth set by the optical detector and this may be typically an order of magnitude.

Lower Manufacturing Tolerances:

Gratings may be produced by mechanical ruling or by holography. In case of mechanical ruling, the manufacturing requirements of a grating are tremendous. It is known that each groove facet of a grating should be flat with smooth straight edges and free from irregularities on a scale of less than $\lambda_{min}/10$. The groove spacing should be maintained within about 1% of the wavelength. For a grating of a size of 10 by 10 mm² for example, and $\lambda_{min}$ of 300 nm such a requirement necessitates a manufacturing tolerance of 30 nm over the entire length of a groove of 10 mm. This equals an angular tolerance along a facet of 3 μrad and a surface roughness well below the 30 nm. The requirement of the high degree of planarity makes low cost replication techniques difficult since the grating must not distort in the process.

In case of holographic production, requirements are more naturally fulfilled as the grating pattern are generated via interference of two coherent laser beams, however, holographic gratings cannot be easily blazed and have a considerably lower efficiency than ruled gratings.

In the described embodiment, it is proposed that individual cells 130, 132, 134 are used to form the phase shifter array 108 and thus, the entire surface can be considered as being divided into small surface elements and requires much lower tolerance levels in terms of surface planarity. Comparing both types for a wavelength of 300 nm, the tolerance on surface planarity for the described embodiment may only be in the range of 30 mrad, which may be four orders of magnitude less stringent while maintaining a similar requirement on surface roughness.

On-Optical-Axis System:

Gratings are generally used off-axis in either transmission (refraction) or reflection modes. In comparison, the described embodiment offers a transmission setup (as described above) offering an advantage of having all optical components on a common optical axis. This results in low optical aberrations and thus a compact device with minimum number of optical elements could be achieved. It is envisaged that the described embodiment may similarly extend to reflection setups.

With a very compact optical interference device, it is possible to adapt the device for use with portable electronic devices such as smart phones. Indeed, in doing so, by ubiquitous presence and ready availability of smart phone-integrated spectrometers, the invention drastically lowers the threshold for using spectroscopy in daily life, commercial, industrial, scientific, medical, cosmetics, biological field while providing all the advantages of spectroscopy over other conventional spectroscopic approaches.

Compact Device Size:

The spectrometer 100 described in the embodiment may not require a high degree of collimation thus allowing for compact short focal length collimators and size.

In a conventional grating spectrometer having a collimator, the focal length of the collimator and an entrance aperture size may have a significant influence on the spectral resolution.

The collimation angle φ is given by:

$$\varphi = \tan^{-1}(\varnothing/2f) \quad \text{(Eq.:2-2)}$$

where $\varnothing$ = diameter of the source point, and f = focal length of the collimator.

To separate two wavelengths in a spectrum, the grating must disperse the incoming beam to angles larger than the collimation angle e.g. $(\Delta\theta = \theta_{m,\lambda2} - \theta_{m,\lambda1} > \varphi)$. See Eq.:2-1 for definitions of $\lambda$, $\theta_m$ etc.

Thus, the spectral resolution (the difference between two neighbouring resolved spectral lines $\Delta\lambda = \lambda_2 - \lambda_1$) is inevitably limited by the collimation angle φ. It may be estimated by differentiating Eq.: 2-1:

$$\Delta\lambda/\Delta\theta = d\cos(\theta_m)/m \quad \text{(Eq.:2-3)}$$

Assuming $\Delta\theta \geq \varphi$ results in:

$$\Delta\lambda \geq \varphi d\cos(\theta_m)/m = \tan^{-1}(\varnothing/2f) d\cos(\theta_m)/m \approx (\varnothing/2f) d\cos(\theta_m)/m \text{ for small collimation angles}$$

or $$\varphi \leq \Delta\lambda m/(d\cos(\theta_m)) \quad \text{(Eq.:2-4)}$$

As a result of Eq. 2-4, grating spectrometers must keep φ at minimum to obtain higher resolution (smaller values of Δλ) and thus require either small entrance apertures (small $\varnothing$) or optically long collimator arrangements (large focal length f) with low acceptance angles.

In the described embodiment of FIG. 1, the spectral resolution is dependent on the maximum optical path difference generated between interfering beams. The collimation angle φ places a resolution limit either when interfering beams of a phase shifter array cell are π out of phase (condition 1) due to inclined angles or when collimation angle is large enough to overlap zero$^{th}$ diffraction order of the longest wavelength and the first diffraction order of the shortest wavelength (condition 2).

It follows:

φ=min[condition 1, condition 2] with:

Condition 1

$$\varphi = \cos^{-1}(1 - \lambda/2\delta_{max})$$

with $\Delta\lambda = \lambda^2/(2\delta_{max})$ it follows:

$$\varphi = \cos^{-1}(1 - \lambda/\lambda)$$

$$\Delta\lambda = (1 - \cos(\varphi))\lambda \quad \text{(Eq.:2-5)}$$

Condition 2:

$$\varphi = \cos^{-1}(\sqrt{((P/\lambda_{min})^2/(1 + P/\lambda_{min})^2))}) \quad \text{(Eq.:2-6)}$$

where

P=period of the phase shifter array; and $\lambda_{min}$=minimum wavelength in the spectrum.

Accordingly, P may be chosen in the range of P=3 to 10 $\lambda_{max}$ to avoid or minimise polarization effects of the phase shifter array 100. It should be mentioned that purposely-designed phase shifter arrays with periods below 3 $\lambda_{max}$ offer polarization sensitive measurements and polarization dependent detection and are part of the scope of the described embodiment.

Figure 14:
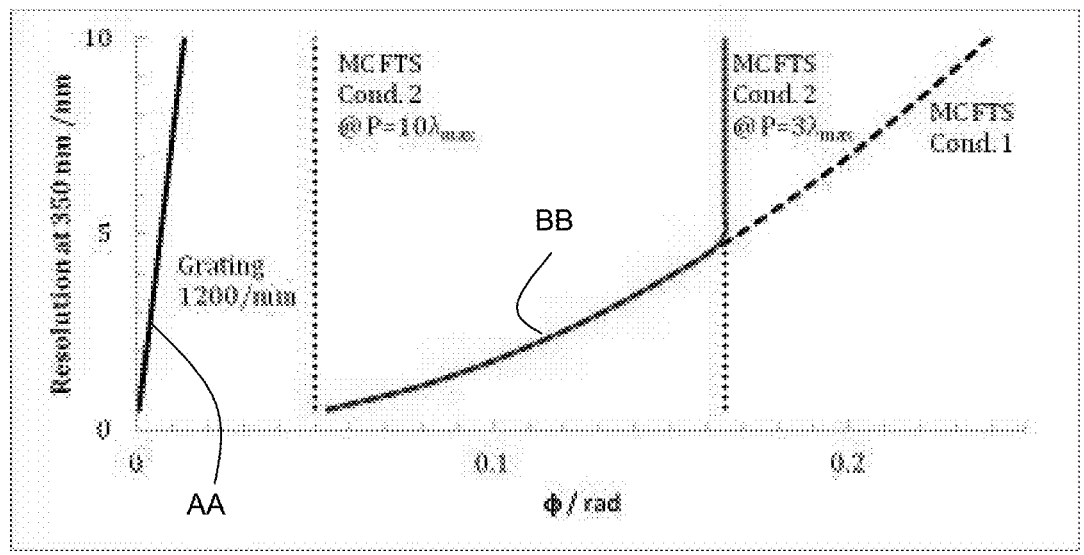
FIG. 14 is a graph comparing requirements for a collimation angle for an exemplary spectrometer and the spectrometer of FIG. 1 for a spectral resolution ranging from 10 nm to 0.5 nm at 350 nm wavelength.

FIG. 14 is a graph which compares requirements for a collimation angle for an exemplary spectrometer and the spectrometer 100 of the described embodiment (MC FTS in FIG. 14) for a spectral resolution ranging from 10 nm to 0.5 nm at 350 nm wavelength. The exemplary spectrometer has a typical grating of 1200 lines per millimeter and line AA marks the requirements of the collimation angle for such a spectrometer. As it can be appreciated from FIG. 14, for a resolution of 10 nm the grating of such a spectrometer requires collimation angles smaller than 0.013 rad. In contrast, the spectrometer 100 of the described embodiment is limited by condition 2 to 0.16 rad at a period of P=3 $\lambda_{max}$ (i.e. maximum wavelength which is 700 nm in this example), a factor of 12 less stringent, and this is shown by line BB in FIG. 14. For the spectrometer 100 of the described embodiment, the collimation angle is given by either condition 1 or 2 (Eq.: 2-5 or 2-6) whichever is smaller.

Figure 15:
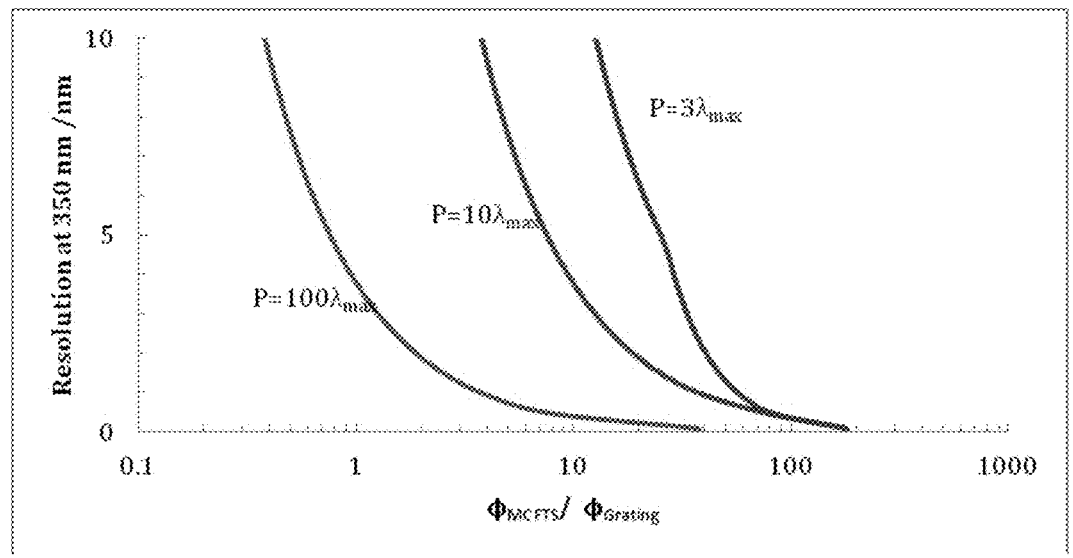
FIG. 15 is a graph which plots ratio of the collimation angle requirement of the exemplary spectrometer and the spectrometer of FIG. 1.

To compare the exemplary spectrometer and the spectrometer 100 of the described embodiment, FIG. 15 is a graph which plots ratio of the collimation angle requirement of the spectrometer of FIG. 1 to the exemplary spectrometer for a spectral resolution ranging from 10 nm to 0.1 nm at a wavelength of 350 nm. The graph of FIG. 15 demonstrates the potential of the spectrometer 100 in terms of size reduction as well as throughput advantage. It should be seen that particularly at higher resolution the spectrometer 100 outperforms the exemplary spectrometer by one to two orders of magnitude. As an example: For a resolution of 1 nm at a minimum wavelength of 350 nm, the spectrometer 100 with a period of 10 $\lambda_{max}$ allows a 40-fold larger collimation angle φ. According to Eq.: 2-2, this allows a 40-fold reduction of the collimator focal length when the aperture size is kept constant between both spectrometers. It should be apparent that the reduction in collimator length reduces the overall system size while it greatly improves the overall acceptance angle for radiation entering the spectrometer and thus the light collection ability at the same time. This is an important advantage for scarce light applications such as Raman spectroscopy or when the detectors are less sensitive as in the case of CMOS detectors in smartphones emphasizing the throughput advantage.

Figure 16:
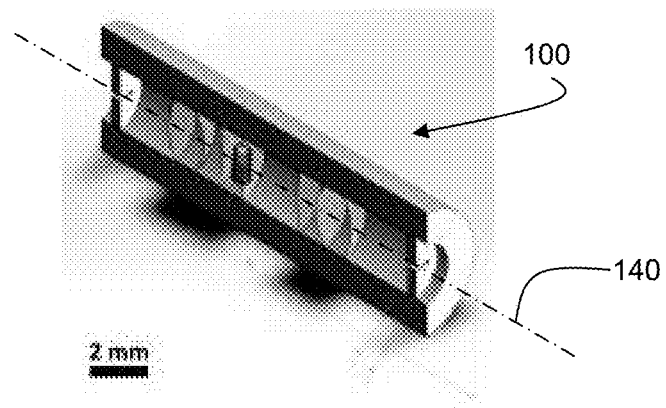
FIG. 16 illustrates an enlarged exemplary size of the spectrometer of FIG. 1 in relation to a 2 mm scale to illustrate possibility of reducing size of the spectrometer as suggested in FIG. 15.
Figure 17:
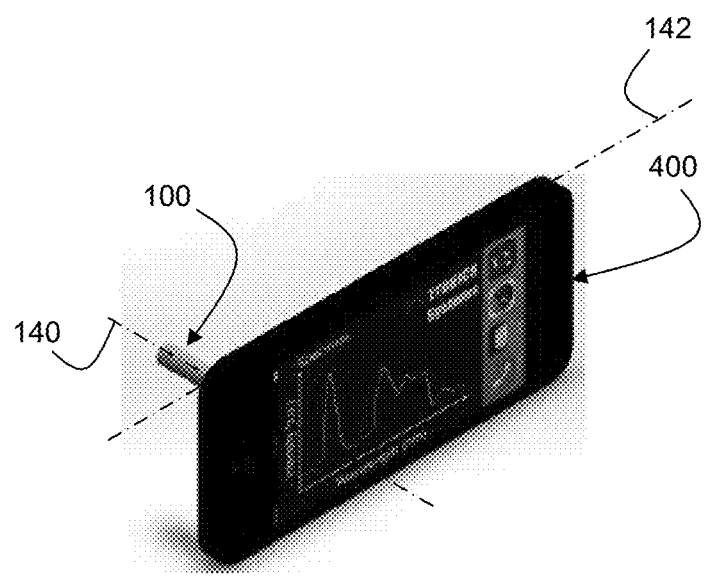
FIG. 17 illustrates the spectrometer of FIG. 16 attached to a camera of a smart phone.

FIG. 16 illustrates an enlarged exemplary physical size of the spectrometer 100 in relation to a 2 mm scale to illustrate a dimensional advantage of the described embodiment. Also, FIG. 17 illustrates the spectrometer 100 of FIG. 16 being housed in an optical housing and attached to a camera of a typical smart phone 400 with a main optical axis 140 of the spectrometer 100 substantially perpendicular to a longitudinal axis 142 of the smart phone 400. It is envisaged that this may not be so, and the spectrometer 100 may also be attached with its main optical axis 140 substantially parallel to the longitudinal axis 142 of the smart phone 400. It is also envisaged that the size of the spectrometer 100 may be further reduced, in particular with the lenslet array 204 as suggested in FIG. 11, such that the spectrometer 100 may be integrated within smart phone's housing.

High Light Throughput:

It is well known that throughput (T) or geometrical extent of an optical system is given by product of the cross-sectional area (A) of a beam and its projected solid angle (Ω):

$$T = A\Omega \quad \text{(Eq.: 2-7)}$$

The projected solid angle is given by:

$$\Omega = \pi \sin^2(\Theta) \quad \text{(Eq.: 2-8)}$$

whereby $\Theta$ describes a half angle of the largest cone of meridional rays that can pass through the optical system.

The throughput is the decisive figure of merit describing an ability of a device to collect and transmit radiation through the optical system. In a subsequent derivation, an estimation is given for the advantage over conventional grating spectrometer devices. As stated earlier the throughput is important for scarce light applications such as Raman spectroscopy, when the detectors are less sensitive, or when integration times to capture a signal are short.

For the spectrometer 100, the throughput follows the same conditions as described for the collimation angle. Thus, $\Theta$ is limited either by collimation angle required for a given resolution (condition 1, in the previous section) or by the angle of the $1^{st}$ diffraction of the shortest wavelength ($\lambda_{min}$) emanating from the spectrometer 100 (denoted as MCFTS) (condition 2) whichever is smaller. It follows:

$$T_{MCFTS} = \min[T_{MCFTS,1}, T_{MCFTS,2}]$$

Condition 1: Combining equations 2-5, 2-7, and 2-8 and setting the requirement for $\Theta \leq \varphi$, the throughput is given by:

$$T_{MCFTS,1} \leq A\pi \frac{\Delta\lambda}{\lambda}\left(2 - \frac{\Delta\lambda}{\lambda}\right)^2 \quad \text{(Eq.: 2-9)}$$

Condition 2

$$\sin(\theta) = \lambda_{min}/P \quad \text{(Eq.: 2-10)}$$

whereby
$\theta$ = the first order diffraction angle; and
P the period of the grating cells.

Combining equations 2-7, 2-8 and 2-10, and setting the requirement for $\Theta \leq \theta$, the throughput is given by:

$$T_{MCFTS,2} \leq A\pi \left(\frac{\lambda_{min}}{P}\right)^2 \quad \text{(Eq.: 2-11)}$$

Where:
A = total area of the phase shifter array 108 (MPSA) structure in case the total system throughput is considered or it is given by the area of a single cell element in case each measurement channel is considered individually.

To derive Eq. 2-9 and Eq. 2-11, the two equations $\sin^2(\cos^{-1}(x)) = 1 - x^2$ and $\sin^2(\sin^{-1}(x)) = x^2$ are simplified for small values of x, respectively.

Comparing the throughput, T, with a conventional spectrometer such as a grating device, $T_{Grating}$ can be estimated by combining equations 2-1, 2-4, 2-7, and 2-8. Using the simplification of $\cos(\sin^{-1}(x)) = \sqrt{1-x^2}$ it follows that the throughput for perpendicularly incident radiation onto such a grating device is given by:

$$T_{Grating} = A\pi \sin^2\left(\frac{\lambda m}{d\sqrt{1-\left(\frac{m\lambda}{d}\right)^2}}\right) \quad \text{(Eq.: 2-12)}$$

where:
A = grating area illuminated,
$\Delta\lambda$ = wavelength resolution,
m = diffraction order,
$\lambda$ = wavelength of the probing beam, and
d = groove period of the grating device.

Figure 18:
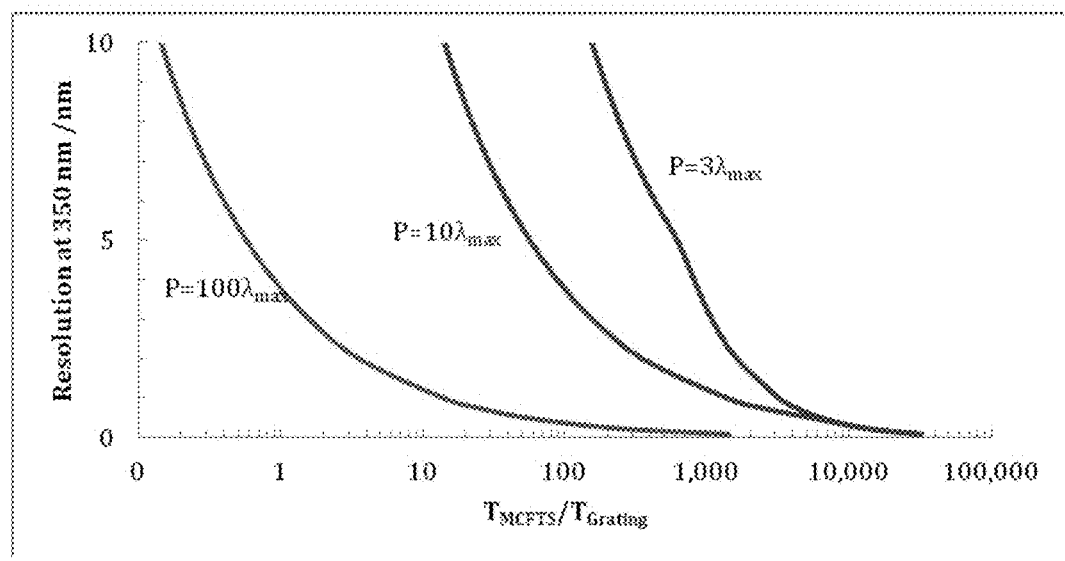
FIG. 18 is a graph which plots ratio of throughput ratio of $T_{MCFTS}/T_{Grating}$ as a function of spectral resolution at $\lambda_{min}=350$ nm wavelength, where $T_{MCFTS}$ is the throughput of the spectrometer 100 of FIG. 1 and $T_{Grating}$ is the throughput of an exemplary grating device.

Using the same assumptions as in the discussion on collimation requirements, the throughputs $T_{MCFTS}/T_{Grating}$ of both devices are compared by plotting the throughput ratio of $T_{MCFTS}/T_{Grating}$ as a function of spectral resolution at $\lambda_{min} = 350$ nm wavelength ($\lambda_{max}$ is set to 700 nm) for the given case that both illuminated areas A are the same for both devices in respect of P=100 $\lambda_{max}$, P=10 $\lambda_{max}$, and P=3 $\lambda_{max}$. The result is shown in FIG. 18 which demonstrates the throughput advantage of the spectrometer 100 of the described embodiment. Particularly at high resolution the spectrometer 100 may increase the light throughput up to 4 orders of magnitude compared to the 1200 lines grating device. This is a tremendous advantage in scarce light applications such as Raman spectroscopy or in cases in which the optical detector is less sensitive. Equally important for the detection of fast signals, higher light throughput improves the system's speed performance as the spectrometer 100 may gather more photons in a given period of time thus allowing shorter integration times.

Spatial Filtering:

Unlike known techniques, a spatial filtering technique is combined with the phase shifter array 108. As proposed in FIG. 1, the exit optical spatial filter 112 (which may have a single slit aperture or a circular aperture array) is placed in at the focal point of the focusing lens 110 to spatially filter higher diffraction orders from entering the optical detector 116. Similarly, the same may be said if the lenslet array 204 and the aperture array 210 are used. This avoids complexity of the known techniques (such as a Soller-collimator) and thus reduces optical components and system costs.

Spectroscopy may have very wide fields of application and a determining factor is the spectral range. For example, in the field of visible spectroscopy and the use of a smart phone camera as a read-out and computation tool, such applications may extend beyond industrial applications to encompass individual smart phone users. The smart phone market is ever expanding and thus, smart phone spectrometers may offer huge potentials such as detection of blood sugar levels or blood oxygen levels to the measurement of UVA (ultraviolet A) which may be used to predict or determine cancer risks and UV protection for sunbathing. Additionally, combining spectroscopy with smart phone platforms, this offers a low-cost point-of-care sensing solutions, which allows information to be sent via the web, which may include feedback, location identification and data logging utilizing cloud services.

In general, visible spectroscopy provides information about:
electron transitions in atoms–atomic information>in addition to infrared providing molecular information
in fluorescence spectroscopy, transitions from excited states to ground state
in Raman spectroscopy, molecular information may be obtained>high impact.
Utilize laser excitation, high resolution phase shifter array tailored to the visible light spectrum plus smart phone to compute Raman resonances in the IR. Very low signal strength, that may be difficult to detect.

Colorimetry: Precise determination of color, including color changes of labeling agents indicating change in concentration or acidity e.g. the change of methyl orange color as pH indicators. Lateral flow tests whereby a color change can be read out by the spectrometer 100 to report a certain event such as a pregnancy.

Concentration monitoring: The visible spectroscopy allows quantifying concentrations by passing light through unknown samples and computing transmittance by comparing I transmitted to $I_0$ sent in. From the transmittance T, the absorbance A=log (1/T) can be computed.

Beer's law allows computing concentrations via A=εC I, whereby A is absorbance, ε is the molar absorptivity coefficient (L/mol cm), C is concentration of absorbing species (mol/L), and "I" the path length (cm).

Chemical labeling—in the visible light spectrum, chromophores absorb highly and thus, it is possible to attach chromophores to molecules which need to be detected;

Concentration rate measurements to study enzymes (proteins present in all living cells). Enzymes are measured by attaching labeling molecules reacting to UV/visible.

Widest use in medicine as indicator for tissue damage. When cells are damaged by disease, enzymes leak into bloodstream and the amount present indicates the severity of tissue damage.

Quantitative determination of solutions of transition metal ions highly conjugated organic compounds, and biological macromolecules.

Solutions of transition metal ions can be colored. The color of metal ion solutions is strongly affected Medical:

Pulse oximeter, measuring transmitted light through finger and monitoring blood oxygen content.

Non-invasive detection of tumors: differentiate tumors from healthy tissue by their increased autofluorescence and differing optical properties.

The described embodiments should not be construed as limitative. For example, arranging the individual cells 128 of varying profile depth together results in a global phase shifter array 108 as shown in FIGS. 3 and 4, and the arrangement of blank elements throughout the phase shifter array 108 may be of any form: on a rectangular grid, circular or randomly distributed. The number of blank cells required depends on the expected degree of uniform illumination. The cell 128 may be a grating cell.

The optical detector 116 may be any device sensitive to electromagnetic radiation such as CCD or CMOS photon detectors for the light (such as UV) to be detected. MCT (Mercury cadmium telluride or HgCdTe) and/or thermal detectors for infrared radiation may also be used. The detector material and the spectral characteristics of the optical components comprising the spectrometer 100 determine the spectral working band. In the case of a visible spectrometer, the spectrometer presented may utilize the camera system of a smart phone or other electronic devices such as tablets to read the interference pattern. Additionally, the processor of the smart phone may be utilized to compute the necessary Fourier-transformation or matrix inversion to obtain the spectral information. Such an arrangement is shown in FIG. 17.

The size of the spectrometer 100 and the various components (eg. the entrance optical filter 102, the collimating lens 106, phase shifter array 108 etc) may be designed and optimized, and it is also possible that the spectrometer 100 may be integrated as part of the smart phone's optical system. It is also possible that in the smart phone 400, additional optics such as a third lens to collimate the beam coming from the exit aperture 114 of the exit optical spatial filter 112 may be utilized to further reduce the system size.

In case of an additional collimating lens, the image of the phase shifter array 108 is then formed at "infinity" while the smart phone's camera optics must be locked at "infinity" focus to form the image of the phase shifter array 108 at the detector plane. Further, if the spectrometer 100 is arranged parallel to the longitudinal axis 142 of the smart phone, mirrors may be arranged along the optical path of the longitudinal axis 142 of the smart phone 400 to permit highly compact spectrometer setups. To avoid chromatic aberrations introduced by the lens system, achromatic lenses may be used.

If a smart phone (or portable electronic device such as tablet) is used to process interference pattern, the camera of the smart phone may function as the optical detector 116 and in this way, the camera may record a pixelated interference pattern generated by the spectrometer 100 and the processor of the smart phone may plots this information as an interferogram from which the spectral composition is computed via Fourier transformation or matrix inversion to present the result.

It is also possible to construct or arrange two (or more) identical phase shifter arrays 108 next to each other and this allows detecting two (or more) spectroscopic channels at the same time. This may be of particular importance for transmission or absorbance measurements. For example, one phase shifter array may be used for a sample beam of light and the other phase shifter may be used for a reference beam of light. This may be performed using the similar focusing lens and exit aperture as in FIG. 1 with one phase shifter array placed next to the other phase shifter array and both phase shifter arrays are imaged onto different locations on a CCD. Alternatively, a similar measurement may be performed using the lenslet array 204 of FIG. 11. In case of a transmission measurement, the sample and reference beam may then be measured at the same time by placing the sample in the collimated beam before the phase shifter array for the sample beam whereas the reference beam path would be unobstructed.

Some of the components of the spectrometer 100 illustrated in FIG. 1 may not be necessary. For example, it is envisaged that the collimating lens 106 may not be necessary.

Figure 19:
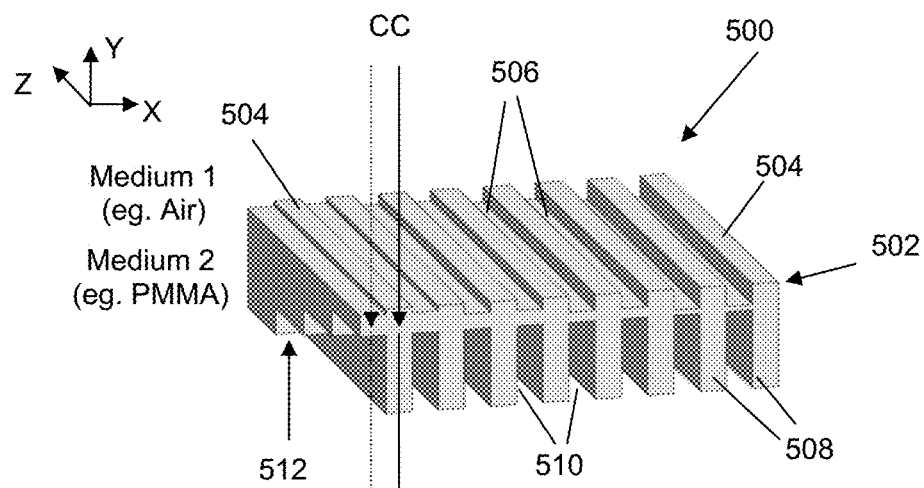
FIGS. 19 to 23 illustrate alternative exemplary shapes and structures of the phase shifter array of FIG. 1.

The phase shifter array 108 may be fabricated in different shapes and dimensions. For example, the phase shifter array 108 may have a triangular cross-section or diagonally extending stairstep surface. FIGS. 19 to 23 illustrate alternative exemplary shapes and structures of the phase shifter array 108, which may have stepped front-side surfaces, stepped back-side surfaces or a combination of both. For example, FIG. 19 illustrates a first phase shifter array variation 500 having a transmissive lamellar structure 502 (beams CC illustrating the transmission) having elongate front side raised members 504 interleaved by front side elongate grooves 506. The lamellar structure 502 also includes backside elongate raised members 508 and backside elongate recessed members 510. It should be appreciated that the front side elongate raised members 504 have varying heights (extending in the Y-axis) and in this variation, the height of the front side elongate raised members 504 increases along the X-axis as shown in FIG. 19 i.e. perpendicular to the Y-axis. Further, the lamellar structure 502 includes a backside stepped surface 512 with progressive steps along the Z-axis direction of the lamellar structure 502.

Figure 20:
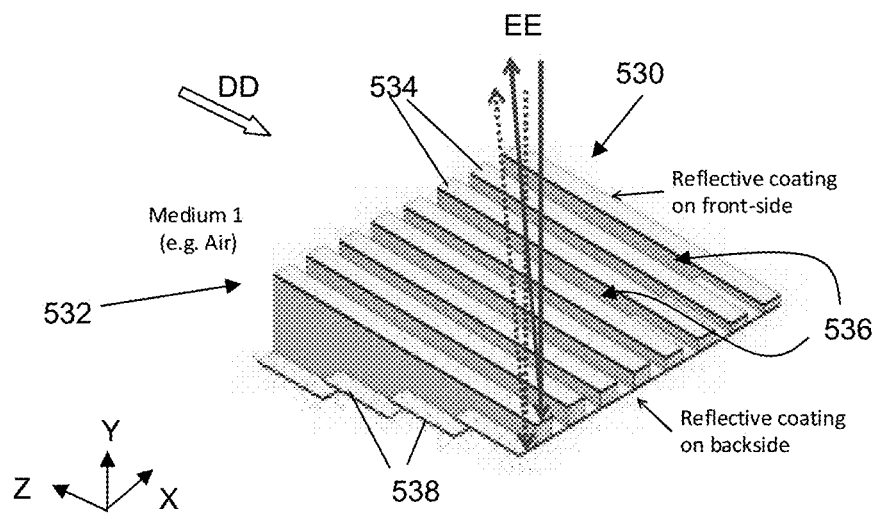
Figure 21:
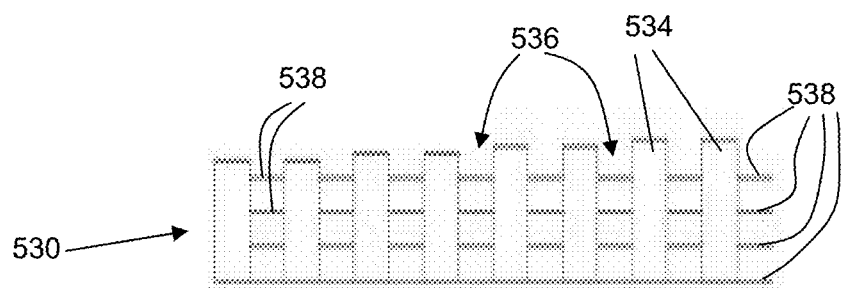

In another variation, FIG. 20 shows a second phase shifter array variation 530 having a reflective lamellar structure 532 including a series of front side raised elements 534 interleaved with recessed elements 536. It should be apparent that the front side raised elements 534 have varying height and this could also be observed from FIG. 21 which is an end view of the second phase shifter array variation 530 in the direction DD of FIG. 20. It may also be appreciated that the recessed elements 536 are arranged in a step manner 538. In this variation, surfaces of the front side raised elements 534 and the recessed elements 536 are coated with a reflective layer and when light enters via the top (as shown by light rays EE), the light rays are reflected by either the front side raised elements 534 or the recessed elements 536.

Figure 22:
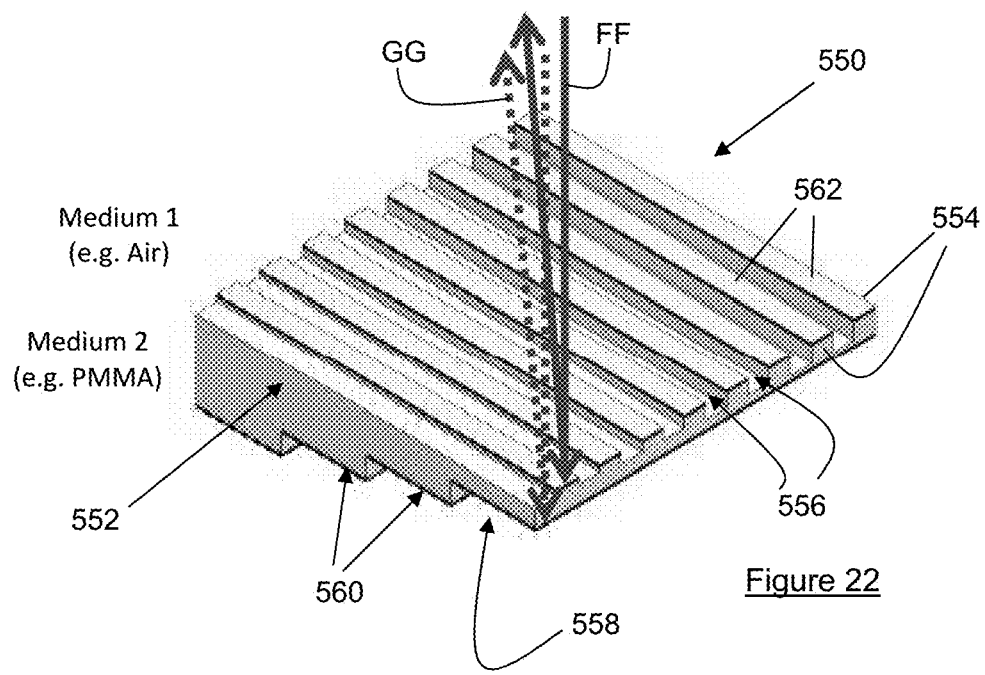
Figure 23:
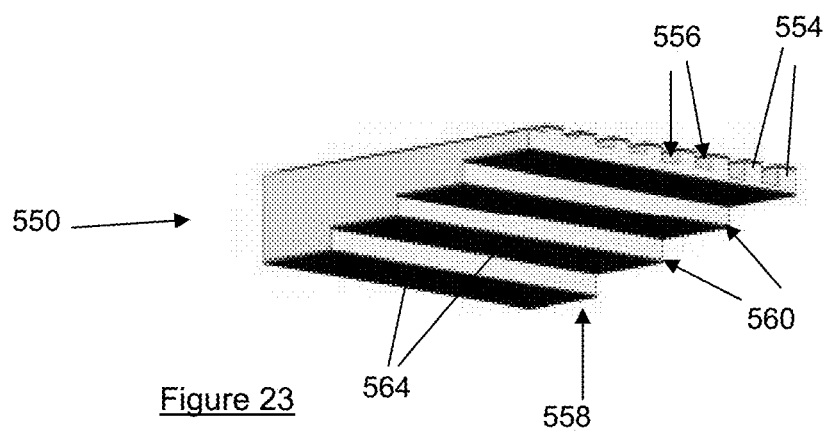

In a further variation, FIG. 22 is a third phase shifter variation 550 having a reflective lamellar structure 552 formed of different media—such as air as medium 1 and PMMA as medium 2. The lamellar structure 552 includes front side protruding members 554 arranged between front side recessed surfaces 556 and the front side protruding members 554 also have varying height profiles. The third phase shifter variation 550 has a back surface 558 having a step-like structure 560 with diagonally extending progressive steps as shown in FIG. 23, which is a back view of the third phase shifter variation 500 of FIG. 22. Top surfaces of the front side protruding members 554 are coated with a reflective coating 562 and the back surface 558 are similarly coated with a back reflective coating 564. In this way, light rays falling on the top surfaces of the front side protruding members 554 are reflected by the reflective coating 562 (without passing through medium 2) as shown by arrow FF, whereas light rays falling on the front side recessed surfaces 556 transmit through medium 2 but are reflected by the back reflective coating 56 as illustrated by arrow GG.

It should be appreciated from these variations that other structures and configurations of the phase shifter array 108 may be used.

Having now fully described the invention, it should be apparent to one of ordinary skill in the art that many modifications can be made hereto without departing from the scope as claimed.

The invention claimed is:

1. An optical interference device comprising:
    a phase shifter array for receiving a collimated beam of light, the phase shifter array comprising a plurality of blank cells, wherein:
        the blank cells do not impose different phase shifts in the collimated beam of light incident on the blank cells; and
        the blank cells are distributed throughout the phase shifter array, thereby forming a structure that divides the phase shifter array into a plurality of array sections, wherein each array section in the plurality of array sections is different from the blank cells, and comprises an array of cells for producing optical light channels from respective rays of the collimated beam of light, at least some of the optical light channels having different phase shifts as the collimated beam of light transmitted through the phase shifter array;
    a focusing element having a focal distance and arranged to produce, from the optical light channels, a focused beam of light in its focal plane and an image downstream the phase shifter array for detection by an optical detector; and
    an optical spatial filter arranged at the focal distance of the focusing element and arranged to filter the focused beam of light to produce a spatially distributed interference light pattern in zero$^{th}$ order for detection by the optical detector.

2. The optical interference device according to claim 1, wherein the focusing element includes a lenslet array, with each lenslet arranged to receive one or more optical light channels, and the spatial filter includes an aperture array, with each aperture arranged at the focal distance of the respective lenslet of the lenslet array.

3. The optical interference device according to claim 1, wherein each cell in at least some of the cells of the array of cells includes a lamellar structure.

4. The optical interference device according to claim 3, wherein the lamellar structure includes alternately raised and recessed surfaces.

5. The optical interference device according to claim 4, wherein the lamellar structure includes an even number of the raised and recessed surfaces.

6. The optical interference device according to claim 4, wherein the lamellar structure includes an odd number of the raised and recessed surfaces.

7. The optical interference device according to claim 4, wherein the alternately raised and recessed surfaces form a concentric pattern.

8. The optical interference device according to claim 1, further comprising an optical collimator arranged to produce the collimated beam of light.

9. The optical interference device according to claim 8, further comprising an entrance aperture for directing an incident light towards the optical collimator.

10. The optical interference device according claim 1, wherein an interferogram is derived from the spatially distributed interference light pattern, and a spectrum is derived from the interferogram by using a system of linear equations.

11. The optical interference device according to claim 10, wherein the linear equations are solved using matrix inversion.

12. The optical interference device according to claim 1 in the form of a Fourier spectrometer.

13. The optical interference device according to claim 1 in the form of a Raman spectrometer.

14. The optical interference device according to claim 1, further comprising a further phase shifter array arranged adjacent to the phase shifter array, wherein the further phase shifter array is arranged to receive a reference beam of light.

15. A device comprising:
    the optical interference device of claim 1, the optical interference device further including an optical housing for housing an optical collimator, the phase shifter array, the focusing element and the optical spatial filter, and
    a portable computing device having the optical detector in the form of a camera or focal plane array,
    wherein the optical housing is adapted to be fitted to the camera or focal plane array, and wherein the camera or focal plane array is configured to detect the spatially distributed interference light pattern.

16. The optical interference device according to claim 1, wherein the device has a spectral resolution dependent on a maximum optical path difference generated between interfering beams.

17. The optical interference device according to claim 16, wherein the phase shifter array has a period not exceeding 10 times a maximum wavelength in the spectrum of the collimated beam of light.

18. The optical interference device according to claim 1, wherein the device has a throughput limited either by a collimation angle required for a given resolution, or by an angle of the first diffraction of the shortest wavelength emanating from the device, whichever is smaller.

19. The optical interference device according to claim 1, wherein the structure formed by the blank cells is a grid structure, a circular structure, or a structure with randomly distributed blank cells.

20. A method for producing a spatially distributed interference light pattern, comprising receiving a collimated beam of light;

directing the collimated beam of light to a phase shifter array comprising a plurality of blank cells, wherein:

the blank cells do not impose different phase shifts in the collimated beam of light incident on the blank cells; and the blank cells are distributed throughout the phase shifter array, thereby forming a structure that divides the phase shifter array into a plurality of array sections, wherein each array section in the plurality of array sections is different from the blank cells, and comprises an array of cells for producing optical light channels from respective rays of the collimated beam of light, at least some of the optical light channels having different phase shifts as the collimated beam of light transmitted through the phase shifter array;

providing a focusing element having a focal distance;

producing, by the focusing element, from the optical light channels, a focused beam of light in its focal plane and an image downstream for detection by an optical detector;

providing an optical spatial filter at the focal distance of the focusing element and filtering the focused beam of light by the optical spatial filter to produce the spatially distributed interference light pattern in zero$^{th}$ order for detection by the optical detector; and measuring spatial intensity distribution of the collimated beam of light.

* * * * *